Oct. 28, 1924.
C. A. BACON
1,513,687
LUBRICATOR AND FILLER THEREFOR
Filed July 27, 1921
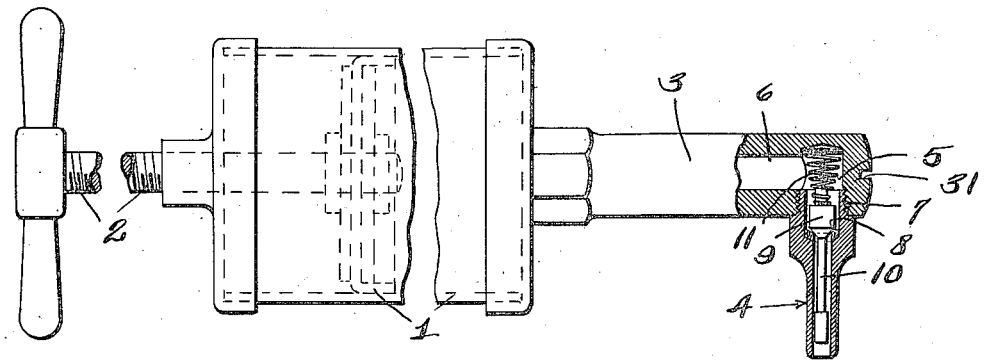
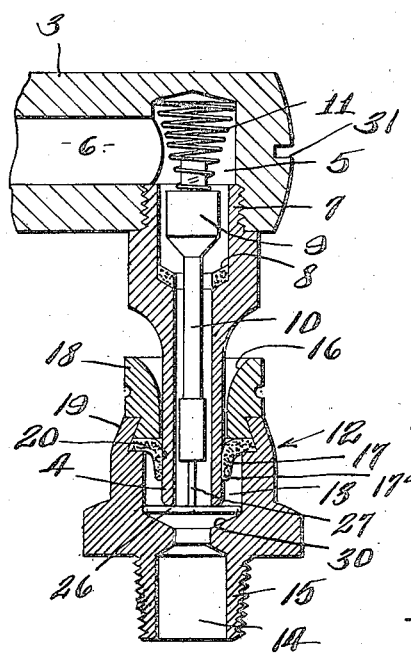
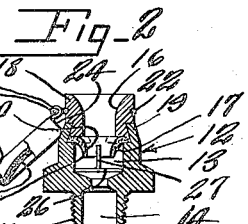
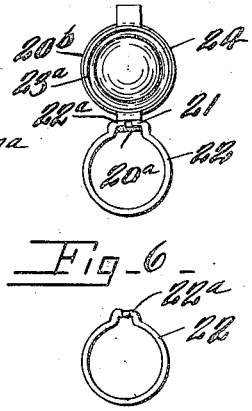
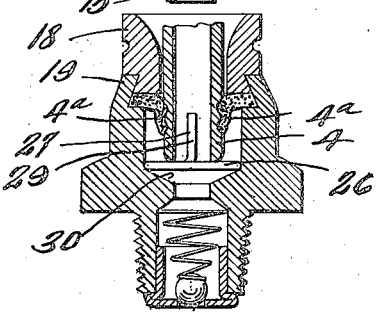
INVENTOR.
BY
ATTORNEYS.

Patented Oct. 28, 1924.

1,513,687

UNITED STATES PATENT OFFICE.

CHESTER A. BACON, OF AUBURN, NEW YORK, ASSIGNOR TO BOWEN PRODUCTS CORPORATION, OF AUBURN, NEW YORK, A CORPORATION OF NEW YORK.

LUBRICATOR AND FILLER THEREFOR.

Application filed July 27, 1921. Serial No. 487,987.

*To all whom it may concern:*

Be it known that I, CHESTER A. BACON, a citizen of the United States, and a resident of Auburn, in the county of Cayuga and State of New York, have invented a certain new and useful Lubricator and Filler Thereof, of which the following is a specification.

This invention relates to lubricating systems such as are used in motor vehicles to lubricate the various bearings, as the spring bolts and other bearings and the bearings of other mechanisms where oil and grease cups are usually placed, and has for its object a particularly simple and efficient construction of receiving element, as a cup and a feed element as the nozzle of a grease gun, by which a sealed connection is automatically made between the grease gun and the receiving element without the use of yokes or connectors and also by which a pressure can be built up within the grease gun before the same is applied to the receiving element or cup, which pressure is released automatically after the nozzle of the grease gun has been inserted fully into the cup, and after the joint between the elements is automatically sealed. It further has for its object a particularly simple and efficient construction whereby the sealing means is reinforced and protected against injury while the nozzle is being placed in the cup and also means whereby the oil in the cup is retarded from running out of the cup as when the vehicle is idle and at other times except when the capillary attraction or other force drawing the oil to the bearing is acting.

The invention consists in the novel features and in the combinations and constructions hereinafter set forth and claimed.

In describing this invention, reference is had to the accompanying drawings, in which like characters designate corresponding parts in all the views.

Figure 1 is an elevation, partly in section, of a grease or oil gun embodying my invention.

Figure 2 is a sectional view of the oil cup for coacting with the grease gun.

Figure 3 is an enlarged fragmentary sectional view showing the nozzle of the oil or grease gun, and the cup in operative relation.

Figure 4 is a detail view of the valve opener.

Figures 5 and 6 are detail views of the member for securing the cover of the cap to the cup.

Figure 7 shows a nozzle having means for increasing the frictional grip of the sealing washer thereon.

This invention comprises generally, a lubricant receiving element having a discharge passage, a feed element for supplying a lubricant to the receiving element, coupling means to automatically couple the elements together, and seal the joint between the elements and means for protecting the coupling and sealing means.

In the illustrated embodiment of my invention, the receiving element is a cup which is attached to the bearing or part to be lubricated and the feed element is a grease gun having a nozzle for entering the cup.

1 designates the barrel of the grease gun which has a suitable piston therein operated by a stem 2 which threads into the head at one end of the barrel 1. The barrel is also provided with a spout 3 projecting from its opposite head and terminating in the nozzle 4. The nozzle is here shown as arranged at an angle to the spout 3.

In the illustrated embodiment of my invention, the spout 3 is formed with a transverse passage 5 near its outer end which intersects the lengthwise passage 6 thereof and the nozzle is provided with a stem 7 at the base thereof which threads part way into the passage 5. The nozzle is also formed with a seat 8 near its inner end and with a valve 9 therein which normally engages the seat 8 and which is formed with a stem 10 extending lengthwise of the nozzle and terminating near the outer end thereof.

11 is a spring thrusting against the valve head 9, this spring being preferably conical in form and the larger portion thereof being located in the end portion of the passage 5 above the nozzle 4 and the smaller portion being located in the upper end of the bore of the nozzle 4. Thus, the spring is held by the walls of the passages in which it is located, from bowing when being compressed during opening of the valve, as owing to the conical formation of the spring, its smaller coils fill the smaller passage in the nozzle and its larger coils fill the end portion of the larger passage 5. Hence, the spring aways thrusts coaxially against the valve 9 and holds it evenly on the seat 8.

Preferably, a washer is interposed between the seat and the valve head.

12 designates the cup which is attached to the bearing to be lubricated, the cup comprising a base formed with an internal chamber or recess 13, a discharge passage 14 leading from the chamber 13 through the threaded stem 15 and an entrance passage 16.

The means for sealing the joint between the nozzle and the cup, as here shown, comprises a flexible member 17 called for convenience, a washer, the washer being of leather or other suitable material and located intermediate of the ends of the cup. It is here shown as located in the countersink formed in the outer end of the base. The margin of the washer 17 around the passage thereof is here illustrated in the form of a conical lip 17$^a$ projecting toward the bottom of the cup in order to be forced by the pressure against the nozzle. However, the washer may be normally flat and made to assume conical form and the walls thereof to taper by the spout of the oil can or nozzle of the grease or oil gun when inserted in the cup through the washer.

Under the back pressure generated in the cup by the oil or grease flowing from the nozzle 4, the washer contacts on the nozzle and frictionally binds or grips the same and overcomes the tendency of the nozzle to be forced out of the cup by the back pressure. If desired, the gripping effect of the washer on the nozzle may be increased by forming the nozzle as shown in Fig. 7 with peripheral grooves or with collars 4$^a$ with which the conical part of the washer engages. However, as the nozzle 4 is usually provided with small peripheral ridges or tool marks it is usually rough enough to cause the washer to tightly grip the same without the use of enlarged ridges as the collar 4$^a$.

The tendency of the nozzle to be forced out of the cup by the back pressure is neutralized by the arrangement of the valve 9 and also by the fact that the nozzle when in the cup is in position to deliver the oil or grease into the discharge passage 14 with a maximum velocity, that is, the pressure is momentarily converted into velocity by the fact that the passage of the nozzle 4 is alined with the discharge passage 14 of the cup so that back pressure against the nozzle does not develop until the bearing or part to be lubricated and the cup are full. In other words, the oil or grease does not dam up until after it is discharged from the nozzle in the part to be lubricated and then is not held back in the nozzle but in the cup where the pressure operating on the sealing means or washer binds the nozzle in the cup. Hence, say at 500 or 600 pounds pressure, no perceptible back pressure is felt by the operation but should the operator turn the handle of the grease gun so that a higher internal pressure is obtained on the grease gun say, 800 or 900 pounds the back pressure is not appreciable until the cup is full, and even with such high pressure, the operator experiences no difficulty in holding the nozzle in the cup and even after the cup is filled and no oil or grease leaks by the sealing washer, and the operator merely being aware of a slight tendency of the nozzle to come out of the cup.

The arrangement of the valve 9 which is of relatively small diameter and formed with smaller pressure areas on the lower or back pressure side thereof than on the upper, tends to neutralize the back pressure or expose a greater or less pressure area toward the open end of the nozzle than to the interior of the grease or oil gun. However, the back pressure is practically neutralized or overcome by the arrangement of the nozzle and the cup whereby pressure of the oil or grease is momentarily converted into velocity until the part to be lubricated and the cup are full, and by sealing gripping actions of the washer.

The entrance passage 16 is shown as formed in the entrance piece 18 which extends into the countersink and engages the outer face of the washer.

The entrance piece is here shown as secured to the base by turning in the upper margin 19 of the base into an annular peripheral groove in the cap piece 18. The passage 16 is preferably contracting and the inner smaller portion thereof is of less diameter than the recess 13 of the cup, but is of slightly greater diameter than the perforation or passage 20 of the washer 17 so that the washer is protected against distortion and injury by the nozzle or by the spout of the oil can, and is also protected against the insertion of a larger spout or oiler than the hole of the washer is designed to receive. As the passage 16 at its inner end, is of less diameter than the recess 13, the washer is reinforced on the top side thereof when subjected to the pressure of the oil flowing from the oil gun, such pressure at times being several hundred pounds.

Owing to the protecting means for the washer, the nozzle can be inserted in the cup without care on the part of the operator even when the cup is located in awkward positions and places, and without injury to the washer, and owing to the reinforcing of the washer on the top side thereof, it cannot be unduly distorted and injured by the pressure and also it is caused to grip the nozzle more snugly and hence form a non-leakable joint.

20$^b$ is a cover or lid for the cup, it being here shown as hinged at 21 in any suitable manner as to the wire 22 encircling the entrance piece. The cover is shaped to snugly fit the entrance opening in order that such opening will be air tight when the cover is closed. Hence, when the cup is filled with oil, the oil will not feed out of the cup except under the capillary attraction, or other force drawing the oil to the bearing. That is, the oil will not be forced out of the cup by atmospheric pressure. Hence, the oil will not feed when the vehicle is standing still, or when lubrication is unnecessary. As here shown, the cover is formed with a convex depressed portion 23, and also a similarly shaped packing or washer 23ᵃ on the inner side of the cover which engages the outer or larger end of the passage 16, the walls of the larger end of which are preferably convex instead of strictly conical. The washer 23ᵃ also serves to prevent water and grit from entering under the cover when the car is being washed or is running over muddy roads. The cover is also formed with an annular flange 24 which laps the outer peripheral face of the entrance piece and also with an arm or handle 25 arranged to snap over the wire 22. The wire 22 is resilient and shaped to form a split annular portion which lies in a groove in the cup or the entrance piece thereof and arms terminating in inwardly extending hinge pins 22ᵃ which enter a tubular eye or roll formed on the hinge leaf 20ᵃ of the cover. The two halves of the wire so shaped are tensioned so that the ends of these pins 22ᵃ lap before the spring is mounted on the entrance piece, Fig. 6, but come into alinement with their opposing ends spaced apart when assembled with the cover and entrance piece. Owing to the part 22 it not only tightly secures the cover against looseness but permits the cover to be turned on the cup so as to be in the best position to be opened and closed.

26 is a valve opener located in the cup beneath the washer 17 and having an axial stem 27 for entering the nozzle 4 and lifting the valve 9 only after the nozzle has been well inserted into the cup and past the washer 17.

As here illustrated, this valve opener comprises an annular base having a radially extending arm 28 which terminates in the upwardly extending axial stem 29. The annular base rests on the bottom of the cup and is held centered by the side walls of the recess 13. The bottom of the cup is tapered as shown at 30 and the annular base of the valve opener rests in the angle formed by the conical bottom 30 and the side walls of the recess 13.

In operation, the pressure may be built up in the oil gun by turning a screw 2 and the nozzle 4 then inserted in the cup. After the end of the nozzle has passed the washer 17 the valve opener 26 in the bottom of the cup engages the end of the stem 10 of the valve 9 and lifts the valve 9 from its seat 8, whereby the lubricant is forced by the pressure built up in the barrel 1 into the cup and through the discharge passage to the bearing to be lubricated. The lubricant is also forced into the cup or the recess 13 up to the washer. The pressure of the lubricant in the recess 13 presses against the lower face of the washer 17 and the conical lip thereof and presses such washer tightly against the periphery of the nozzle, and hence tightly seals the joint between the cup and the nozzle. When the nozzle is withdrawn, the valve 9 closes and the oil in the cup may or may not rise above the level of the washer. The cover is then closed, and as it forms an air tight joint the oil will not feed under the influence of atmospheric pressure, but will only feed when drawn to the bearing by capillary attraction or other force present when the bearing is in operation.

The spout 3 of the grease cup is usually provided with a slot or projection 31 by means of which the cover of the cup may be opened by engaging the handle 25 thereof with such notch or projection.

What I claim is:

1. The combination of a lubricant receiving element having a discharge passage, a feed element for connection to the receiving element, one of said elements having a nozzle and the other a cup for receiving the nozzle, the feed element having a normally closed valve therein and the receiving element having means for opening the valve when the nozzle is inserted to its full extent into the cup, and expansible and contractile means arranged to engage the periphery of the nozzle and operable by the pressure of the lubricant in the receiving element to grip the nozzle for sealing the joint between the nozzle and cup and preventing back flow of the lubricant out of such joint and preventing the back pressure from forcing the nozzle out of the receiving element, substantially as and for the purpose specified.

2. The combination of a lubricant receiving element having a discharge passage, a feed element for connection to the receiving element, the receiving element having a cup and the feed element a nozzle for entering the cup, the nozzle being formed with a valve seat, a valve normally engaged with the seat and having a stem extending toward the end of the nozzle, and a valve opener in the cup near the bottom thereof for engaging the valve stem and opening the valve when the nozzle is inserted in the cup, the valve opener comprising an annular base formed with an axial stem for entering the nozzle and pushing against the end of the valve stem, the base resting on the bottom of the cup, substantially as and for the purpose described.

3. The combination of a lubricant receiving element having a discharge passage, a feed element for connection to the receiving element, the receiving element having a cup and the feed element a nozzle for entering the cup, the nozzle being formed with a valve seat, a valve normally engaged with the seat and having a stem extending toward the end of the nozzle, and a valve opener in the cup comprising an annular base formed with an inwardly extending radial arm terminating in an axial stem for entering the nozzle and pushing against the end of the valve stem, substantially as and for the purpose specified.

4. The combination of a lubricant receiving element having a discharge passage, a feed element for connection to the receiving element, the receiving element having a cup and the feed element, a nozzle for entering the cup, the nozzle being formed with a valve seat, and a valve normally engaged with the seat and having a stem extending toward the discharge end of the nozzle, and the cup being provided with an entrance piece at its outer end, sealing means between its ends for engaging the nozzle and operable by the pressure generated by the lubricant flowing from the nozzle into the cup to seal the joint between the nozzle and the cup, and a valve opener below said means for engaging the valve stem and open the valve when the nozzle is inserted in the cup past said sealing means, substantially as and for the purpose set forth.

5. The combination of a lubricant cup, and a lubricant gun having a nozzle for entering the cup, the nozzle being provided with a normally closed valve therein, and the cup having a flexible washer between its ends operable by the pressure of the lubricant generated by the fluid flowing from the nozzle to snugly engage the nozzle and seal the joint between the cup and the nozzle, the cup also having a valve opener located below the washer and an entrance piece above the washer, said piece having a contracting passage, the inner end of which is alined with the opening in the washer, the inner end of the contracting passage being of slightly greater diameter than the opening in the washer and of less diameter than the recess of the cup below the washer, substantially as and for the purpose described.

6. The combination of a lubricant cup having a receiving chamber and an outlet passage of less diameter than the receiving chamber, and the feed element having a nozzle for entering the cup terminating with its inner end near the bottom of the cup and with its passage in line with the outlet passage of the cup, the cup being provided with a flexible washer spaced apart from the bottom of the cup, the opening of the washer being of less diameter than the nozzle whereby the washer assumes a conical form when the nozzle is passed therethrough, a valve in the nozzle normally closing the same and having a stem extending toward the free end of the nozzle, a valve opener in the cup below the washer for engaging the end of the stem when the nozzle is inserted into the cup through the washer, all whereby the fluid flowing from the nozzle is initially passed to the outlet passage of the cup and thereafter fills the chamber of the cup so that the pressure thereof causes the washer to grip the nozzle and seal the joint between the nozzle and the cup and overcome the tendency of the nozzle to be forced out of the cup by the back pressure and whereby the part to be lubricated and the cup is filled before the back pressure tends to force the nozzle out of the cup, substantially as and for the purpose specified.

In testimony whereof, I have hereunto signed my name, at Auburn, in the county of Cayuga, and State of New York, this 21st day of July, 1921.

CHESTER A. BACON.